United States Patent
Barnard

[15] 3,643,255
[45] Feb. 15, 1972

[54] PLURAL COLOR LAMP INDICATOR

[72] Inventor: Dominic Paul Edmund Barnard, Witney, England

[73] Assignee: Smith Industries Limited, London, England

[22] Filed: Sept. 30, 1970

[21] Appl. No.: 76,824

[30] Foreign Application Priority Data

Oct. 3, 1969 Great Britain......................48,729/69

[52] U.S. Cl.............................................340/381, 340/112
[51] Int. Cl.................................................................G09f 9/00
[58] Field of Search..........................................340/112, 381

[56] References Cited

UNITED STATES PATENTS

1,671,845  5/1928  Stork ....................................340/112

Primary Examiner—Harold I. Pitts
Attorney—William D. Hall, Elliott I. Pollock, George Vande Sande, Charles F. Steininger and Robert R. Priddy

[57] ABSTRACT

Indicator apparatus comprising a plurality of light bulbs, conveniently capless light bulbs, each of which can emit a primary light beam to a common region and a second light beam to an individual region associated with that particular light bulb. The primary light beam of some of the light bulbs has a first color, e.g. red, while the primary light beam of others of the light bulbs has a second color, e.g. yellow. The secondary light beam of all the light bulbs has a third color, e.g. blue or green, imparted to it by a filter which is substantially opaque to stray or unwanted light from the first or second colored primary light beam so as to avoid a false or confusing visual indication being obtained from the apparatus.

9 Claims, 5 Drawing Figures

PATENTED FEB 15 1972 3,643,255

Dominic Paul Edmund Barnard
Inventor by Hall, Pollock & Vande Sande
Attorneys

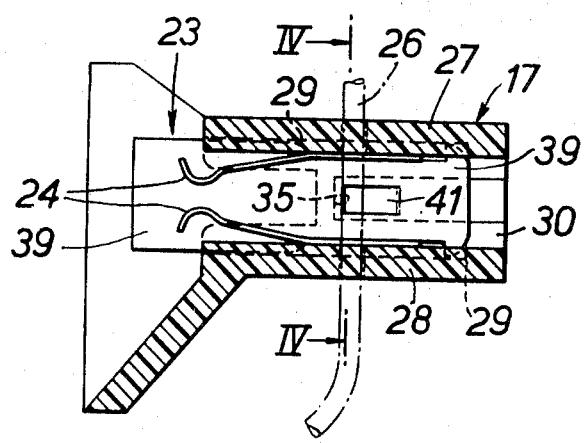
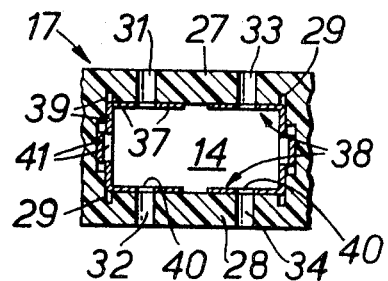
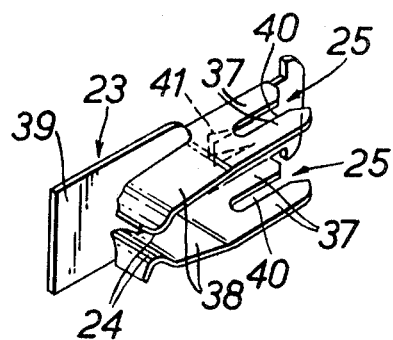

PLURAL COLOR LAMP INDICATOR

The present invention is directed to subject matter similar to that described in Barnard and Bishop prior copending application Ser. No. 884,967, filed Dec. 15, 1969, for "Holder for a Capless Light Bulb."

This invention relates to indicator apparatuses and in particular to an indicator apparatus for visually indicating to an observer a condition in equipment to which the indicator apparatus is connected.

According to this invention there is provided an indicator apparatus for visually indicating to an observer a condition in equipment to which the indicator apparatus is connected, comprising a casing provided with a window that has a first portion and a plurality of distinct second portions which are each of smaller area than the area of said first portion. At least one first electrically energizable light source and at least one second electrically energizable light source, each of said light sources being intended to be electrically connected to the equipment so as to be electrically energized when a condition is present in the equipment, are mounted within the casing so that, upon electrical energization, a part of the light emitted by any one light source will be visible as a primary beam of light through said first window portion and a remaining part of the light emitted by each light source will be visible as a secondary beam of light specific to the condition through an associated second window portion. First light filtering means are provided to impart a first color to the primary beam emanating from said first light source(s); second light-filtering means are provided to impart a second color to the primary beam emanating from said second light source(s); and third light-filtering means are provided to impart a third color to the secondary beam emanating from said first light source(s) and from said second light source(s); said first, second and third colors being different from one another and such that said third light-filtering means is substantially opaque both to light having said first color and to light having said second color.

By being substantially opaque both to light having said first color and to light having said second color, the third light-filtering means will transmit little or no stray or unwanted light having either said first or said second color. Such stray or unwanted light could possibly occur where some of the first colored light, e.g., emanating from one electrically energized first light source would otherwise be transmitted through a nonenergized light source to be visible through the second window portion associated with that nonenergized light source and thereby give a false or confusing visual indication.

As used herein, the term "color" does not include "white."

Preferably at least one of said first, second and third colors is at least nearly a saturated color. Conveniently the first, second and third colors may be red yellow and blue respectively, although preferably they are red, yellow and green respectively.

The first and/or second filtering means may be constituted by a coloring agent in or on a translucent material. The translucent material may be of sheet plastics material, or preferably is of glass forming a portion of a glass envelope associated with respectively the first and/or second light source.

The third filtering means may be constituted by a coloring agent in or on a translucent material. The translucent material may be glass forming a portion of a glass envelope associated with the first and second light sources, or preferably is of sheet plastics material.

Preferably each light source is a capless light bulb comprising an electric element and two supply wires surrounded by a sealed glass envelope that is formed with a primary bulbous portion spaced about the element and with a secondary, pinched portion sealed about the supply wires, the supply wires projecting from the pinched portion and being bent back upon themselves, preferably one on each side, over the external surface of the pinched portion to constitute the terminals of the capless light bulb.

Preferably there is provided holding means adapted to mount the capless light bulbs within the casing each in substantial alignment with its associated second portion of the window so that, for each capless light bulb, said primary and secondary beams emanate respectively from said primary, bulbous portion and from said secondary, pinched portion.

Preferably the first portion of the window does not incorporate within its larger area the smaller area second portions of the window.

BRIEF DESCRIPTION OF THE DRAWINGS

By way of example an embodiment of this invention will now be described, reference being had to the accompanying drawings of which:

FIG. 3 shows a detail of FIG. 2 on a larger scale;

FIG. 4 is a cross-sectional view taken along the line IV—IV of FIG. 3; and

FIG. 5 is a perspective view of an electrical connector.

DESCRIPTION OF THE PREFERRED EMBODIMENTS

Figure 1:
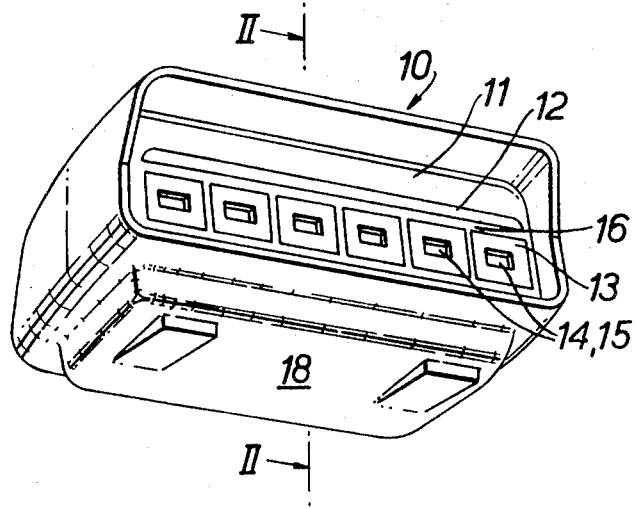
FIG. 1 is a perspective sketch of an indicator for visually indicating to an observer (by means of warning light bulbs) a condition in equipment to which the indicator may be connected and shows a housing substantially similar to that of U.K. Registered Design No. 940,568.
Figure 2:
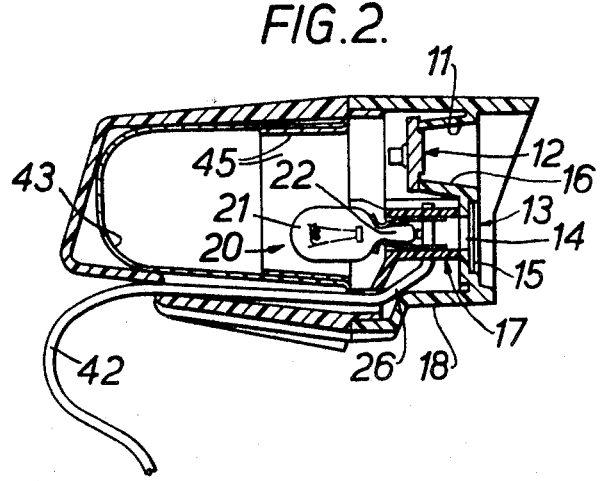
FIG. 2 is a cross-sectional view taken along the line II—II of FIG. 1.

Referring first to FIGS. 1 and 2, the indicator apparatus is housed in a casing 10 formed of plastics material and shaped generally as a parallelepiped of rectangular cross section, the front wall 11 of the casing being separable from the remainder of the casing and comprising a window that is divided into upper and lower portions 12 and 13. The upper portion 12 is recessed inwardly so that part of the casing top wall (which part is integral with the front wall 11) extends forwardly thereof to constitute a shroud, is continuous, and extends almost the whole width of the front wall from casing side wall to casing side wall. The lower portion 13 is discontinuous, the discontinuations being provided by six apertures 14 each of which is covered externally by a strip 15 of green-colored translucent material. Alternatively the strips 15 may be of blue-colored translucent material. The upper and lower portions of the window are separated along their length by an intermediate wall 16 that projects inwardly of the casing towards the rear wall and that is generally parallel to the top and bottom walls of the casing.

A holder 17 is moulded of opaque (preferably white) plastics material with six similar chambers (each of which is to receive a capless light bulb 20) and with means for removable snap-fit attachment of the holder to the front wall 11 internally of the casing between the intermediate and bottom walls 16 and 18 of the casing. Each capless light bulb 20 (see FIG. 2) comprises an electric element and two supply wires surrounded by a sealed glass envelope that is formed with a bulbous portion 21 spaced about the element and with a pinched portion 22 sealed about the supply wires, the supply wires projecting from the pinched portion and being bent back upon themselves, one on each side, over the external surface of the pinched portion to constitute the terminals of that capless light bulb. The bulbous portions of some of the light bulbs are coated with a red-colored translucent film and the bulbous portions of some others of the light bulbs are coated with yellow-colored translucent film. Alternatively red or yellow colored translucent caps may be fitted around the clear, non-colored bulbous portions, or red or yellow color imparting pigments may be introduced into the glass mix prior to forming the bulbous portions. Preferably the red and yellow colors are saturated red and saturated yellow (or at least as near as possible to saturated red and saturated yellow). The six similar chambers, one for each capless light bulb, are provided through the holder 17 in aligned communication with the apertures 14. Each chamber (see also FIG. 3) is internally fitted with two identical contact elements constituted by resilient metallic contact strips 23 disposed to be each a mirror image of the other. The rear ends 24 of the contact strips 23 directly engage the terminals of a capless light bulb in the region of its pinched portion 22 so that the bulbous portion 21 projects from the rear (i.e., inner) end of the holder 17. The aperture 14 through the opposite end of the holder (i.e., through the casing front wall 11) is such that in use illumination from the light bulb's electric element may travel rearwardly of the light bulb (i.e., forwardly of the casing) through the pinched portion 22 of the glass envelope and outwardly of the holder 17 through its associated aperture 14 in said opposite end. The front ends 25 of the contact strips 23 (see FIG. 5) each have at least one open-ended elongate slot 40 therein to accommodate transversely of the strip the central conductor of an insulated supply lead 26. Each pair of contact strips 23 thereby serve as electrical connectors for interconnecting the two terminals of a capless light bulb and the two insulated electrical supply leads for those terminals.

As best shown in FIGS. 3 and 4, each of the six chambers of the holder 17 is of generally rectangular cross section with internal dimensions substantially equal to the dimensions of each aperture 14. The top wall 27 of each chamber has two holes 31, 33 therethrough in vertical alignment with two holes 32, 34 extending through the bottom wall 28 of that chamber. Channels 29 extending longitudinally of each chamber (i.e., normal to the front wall 11) are provided in the chamber top and bottom walls at their intersection with the chamber side walls 30. Each sidewall is stepped intermediate its length to provide a shoulder 35 that faces the casing front wall 11. As best shown in FIG. 5, each contact each contact strip 23 is shaped from a metal sheet stamping of generally E-shaped configuration, so that its two outer limbs 38 face one another and are disposed substantially at right angles to the central limb 39. The limbs 38 adjacent their rear ends 24 are bowed inwardly towards one another and at their planar, platelike front ends 25 are each provided with an open-ended longitudinally directed elongate slot 40 defined by the parallel edges of jaws 37 (having suddenly diverging extremities) that form part of that limb's front end. The central limb 39 is provided intermediate its ends with a laterally bent-out tag 41.

During assembly, the holder 17 is placed on a jig (not shown) having six vertically upstanding blocks which enter into the front ends (i.e., those to be disposed nearest casing front wall 11) of the holder's six chambers whereby the two pairs of holes 31, 32 and 33, 34 are each in horizontal alignment. For each chamber, the end portion of one insulated supply lead 26 is inserted horizontally first through hole 32 and then on through hole 31, and the end portion of another insulated supply lead 26 is inserted horizontally first through hole 34 and then on through hole 33. Thus each supply lead end portion is supported in a generally horizontal attitude by the holder's temporarily vertically disposed top and bottom walls 27, 28 and is temporarily supported in between these walls 27, 28 by the planar uppermost horizontal face of the jig block projecting into that chamber.

An electrical connector for each of the two supply leads 26 in each chamber (which connector is constituted by a contact strip 23) is inserted vertically downwards into the chamber from the rear (i.e., uppermost) end thereof with the slotted front end portion 25 leading. The channels 29 receive the lateral edges of central limb 39 and, during insertion, the chamber sidewall 30 parallel to central limb 39 is deformed until the extremity of the resilient tag 41 passes the sidewall shoulder 35 which thereafter inhibits removal of the connector. As the connector is inserted, each pair of jaws 37 of its leading front end portion 25 engage the insulated supply lead 26 and cause the latter to enter into the elongate slot 40, defined by that pair of jaws, the internal jaw edges simultaneously causing the insulation to be removed in the plane of the platelike front end part of each limb 38 so that the internal jaw edges resiliently engage the sides of the central conductor of the otherwise insulated supply lead 26 in the two spaced-apart planes. Thus each one of a pair of electrical connectors 23 is anchored in each chamber by its tag 41 and is connected to each one of a pair of supply leads 26 at two locations spaced apart longitudinally of that supply lead. The holder 17 is then removed from the jig (whence each insulated supply lead 26 is unsupported between the limbs 38) and either before or after the holder 17 is snap-attached to the casing front wall 11, a capless light bulb is inserted into the rear of each chamber with its pinched portion 22 leading so that the connector rear ends 24 snap over the pinched portion 22 to thereby removably retain the capless light bulb in the chamber and simultaneously engage its terminals.

The 12 insulated supply leads 26 are gathered together within the casing and pass through an aperture in the casing bottom wall 18 as a planar band 42 with the insulation of each supply lead 26 bonded (e.g., adhesively) to the insulation of its neighboring supply lead 26.

A reflector 43 is located between the top and bottom walls of the casing 10 to reflect light outwardly of the casing through the upper window portion 12. The reflector 43 may be a white painted sheet curved both in the vertical plane (as shown in FIG. 2) and in the horizontal plane, or may be a similarly curved vacuum or pressure moulding formed of white plastics material. A metal band 45 (e.g., aluminum) conforming to the maximum internal dimension of the reflector 43, locates the reflector in position and serves as a heat shield and/or sink as well as to assist in the reflection of light emanating from the bulbous portion of any one capless light bulb.

In use, when one of the capless light bulbs is on, a beam of light is directed rearwardly of the light bulb through the pinched portion 22 (i.e., forwardly of the casing) and is visible in the lower portion 13 of the window through the associated aperture 14 as a narrow beam of green light due to the color of the translucent strip 15 covering that aperture. Simultaneously a beam of light from the same light bulb is directed forwardly of the light bulb through the bulbous portion 21 (i.e., rearwardly of the casing) and has a red or yellow color depending on that bulbous portion's translucent coating. This red or yellow-colored light beam is reflected by the reflector 43 so as to pass through the upper portion 12 of the window and be visible as a wide beam of red or yellow light extending substantially uniformly over the whole area of the upper portion of the window.

Since the reflector 43 will also reflect some red or yellow light through the remaining, unlit capless light bulbs, the green strips 15 associated with those unlit light bulbs, acting as a filter, will stop this unwanted red or yellow light passing wholly through the window portion 13 and so prevent observer confusion as to which of the capless light bulbs is actually on. It will be appreciated that the red or yellow coatings on the bulbous portions of the unlit capless light bulbs will themselves act to some extent as filters to the unwanted reflected light from the light bulb that is actually on. For example, if a yellow-coated capless light bulb is on, most of the unwanted reflected yellow light can pass through the remaining unlit yellow-coated capless light bulbs and little if any can pass through the unlit red-coated capless light bulbs. Whether the light incident on on filter strips 15 is wanted "white" light emanating from the light bulb's glowing electric element or is unwanted reflected red or yellow light transmitted by or through the glass envelope of an unlit light bulb, only the wanted light is transmitted by the green filter strip 15 associated with the light bulb that is actually on, the green filter strips 15 associated with the remaining unlit light bulbs being substantially opaque to the unwanted red or yellow light incident thereon. It will be readily appreciated that the color of the strips 15 can in practice be chosen to be substantially opaque to both the light colors transmitted by or through the bulbous portions 21; that is to say the range of light wavelengths that the filtering strips 15 will transmit can exclude the ranges of the light wavelengths emanating from the coated bulbous portions. As an alternative to the strips 15 being green (the preferred color), they may be of blue colored translucent material which, although theoretically more suitable, in practice might not transmit sufficient light since the "white" light produced by the electric elements of the preferred capless light bulbs is somewhat lacking in wavelengths associated with the color "blue," and the color "green" occupies a substantial area (or volume) of the color "triangle" (or space)—see "Physical Aspects of Colour" by Dr. P. J. Bouma (particularly FIG. 110 and the color plate photograph accompanying the book). Conveniently the green filter strips 15 may be of the material made and sold by British Celanese Limited and known as "CELASTOID 20," whereas the blue filter strips 15 may be of the material made by British Celanese Limited and sold by Rank Strand Electric Limited as "CINEMOID 19."

It will be apparent that the above described indicator apparatus provides little or no masking of the capless light bulbs 20, the distinction between light colors being provided by light-filtering means.

For example, if the indicator is connected in a motor vehicle, it may be considered imperative for the vehicle to be stopped immediately if any one of the following (category A) conditions are present:

Low Oil Pressure
High Coolant Temperature,
Low Brake Fluid,
Low Clutch Fluid,
Low Power-Steering Fluid,
Light Failure,
Bonnet or Doors Open;

and to be stopped as soon as conveniently possible if any one of the following (category B) conditions are present:

Generator Malfunction (e.g., broken fan belt),
Low Fuel Level,
Low Coolant Level,
Boot Open,
Brake Linings Worn.

Although the presence of a specific condition in either of categories A and B will be indicated to the observer by the smaller area of green (or blue) light visible over the aperture 14 in the lower portion 13 of the window, the degree of safety hazard may be conveniently differentiated between the two categories by covering the bulbous portions of the light bulbs corresponding to category A conditions with red-colored translucent cap or film coating, and by covering the bulbous portions of the light bulbs corresponding to the category B conditions with a yellow-colored translucent cap or film coating. Furthermore, if the indicator is to be additionally used for indicating generally non-hazardous (category C) conditions such as:

High Light Beam On,
Trafficator On,
Handbrake Operational,
Spot or Fog or Reversing Light On, the bulbous portions 21 of the capless light bulbs corresponding to each of these category C conditions may be masked or shielded from the reflector 43 so that light from any one of these light bulbs is only visible as a small green (or blue) beam in the lower portion 13 of the window over the aperture 14 and is not visible over the substantially larger area of the upper portion 12 of the window.

It will be appreciated that legends corresponding to the conditions may be marked on the similarly colored translucent strips 15, or may be marked on the forwardly directed edge of the intermediate wall 16. As an alternative to adhesively securing the green- (or blue) colored strips 15 in the apertures 14, they may be trapped between the holder 17 and the internal surface of casing front wall 11. In another alternative arrangement, the strips 15 are omitted and each of the apertures 14 is fitted with a removable button of green (or blue) colored translucent material to achieve the same result.

In an alternative construction the holder 17 for the several capless light bulbs may be moulded integrally with the front wall 11 and/or be formed of a clear transparent or a green (or blue) translucent plastics material, in which case the six chambers need not be apertured as at 14 at their front ends remote from the bulbous portions of the light bulbs. Furthermore, instead of a single holder being moulded for several capless light bulbs, each light bulb may have an individual holder which of course can be of modular construction to permit of ready coupling together of several such individual holders.

It will be apparent that the number of conditions to be indicated by the indicator, and their category, may be readily chosen by selecting (for categories A and B) the desired number of light bulbs with the desired colored covering (or pigmentation) of their bulbous portions and inserting them into their chambers in the holder 17 from the front of the casing. The fact that the casing front wall 11 is removable facilitates this operation as well as the replacement of burnt-out light bulbs. To facilitate individual selection of the conditions desired to be indicated, and in which hazard category (A or B), the legends may be provided on pressure-adhesive labels and the light bulbs may be chosen according to the color of the covering (or pigmentation) of their bulbous portions (for hazard category C the "color" may of course be black).

Having thus described my invention, I claim:

1. Indicator apparatus for visually indicating to an observer a condition in equipment to which the indicator apparatus is connected, comprising
   a. a casing provided with a window that has a first portion and a plurality of distinct second portions which are each of smaller area than the area of said first portion;
   b. at least one first electrically energizable light source and at least one second electrically energizable light source;
   c. means for electrically connecting each of said light sources to the equipment for energization when a condition is present in the equipment;
   d. means for mounting said light sources within the casing so that, upon energization, a part of the light emitted by any one light source will be visible as a primary beam of light through said first window portion and a remaining part of the light emitted by each light source will be visible as a secondary beam of light specific to the condition through a second window portion associated with that light source;
   e. first light-filtering means to impart a first color to the primary beam emanating from the or each said first light source;
   f. second light-filtering means to impart a second color to the primary beam emanating from the or each said second light source; and
   g. third light-filtering means to impart a third color to the secondary beam emanating from the or each said first light source and from the or each said second light source; and wherein said first, second and third colors are different from one another and such that said third light filtering means is substantially opaque both to light having said first color and to light having said second color.

2. Indicator apparatus according to claim 1, wherein at least one of the said first, second and third colors is at least nearly a saturated color.

3. Indicator apparatus according to claim 1, wherein said first, second and third colors are respectively red, yellow and blue.

4. Indicator apparatus according to claim 1, wherein said first, second and third colors are respectively red, yellow and green.

5. Indicator apparatus according to claim 1, wherein at least one of said first, second and third filtering means is constituted by a coloring agent associated with a translucent material.

6. Indicator apparatus according to claim 5, wherein said third filtering means is constituted by a coloring agent in a translucent sheet plastics material.

7. Indicator apparatus according to claim 5, wherein said first filtering means is constituted by a coloring agent on a translucent glass material forming a portion of the glass envelope that is associated with the or each said first light source, and wherein said second filtering means is constituted by a coloring agent on a translucent glass material forming a portion of the glass envelope that is associated with the or each said second light source.

8. Indicator apparatus according to claim 1, wherein each of said light sources is a capless light bulb comprising an electric element, two supply wires, and a sealed glass envelope encompassing said element and part of said supply wires; wherein the glass envelope comprises a primary, bulbous portion spaced about the element and a secondary, pinched portion sealed about the supply wires; and wherein the supply wires project from the pinched portion and are bent back upon themselves over the external surface of the pinched portion to constitute terminals for the capless light bulb.

9. Indicator apparatus according to claim 8, wherein the mounting means comprises holding means for locating the capless light bulbs within the casing each in substantial alignment with its associated second portion of the window so that for each capless light bulb said primary and secondary beams emanate respectively from said primary, bulbous portion and from said secondary, pinched portion.

* * * * *